US007409284B2

(12) United States Patent
Okamoto et al.

(10) Patent No.: US 7,409,284 B2
(45) Date of Patent: Aug. 5, 2008

(54) APPARATUS FOR ESTIMATING AIR-FUEL RATIOS AND APPARATUS FOR CONTROLLING AIR-FUEL RATIOS OF INDIVIDUAL CYLINDERS IN INTERNAL COMBUSTION ENGINE

(75) Inventors: Akihiro Okamoto, Hashima-gun (JP); Masayuki Kita, Kariya (JP); Keiji Wakahara, Inazawa (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/783,012

(22) Filed: Apr. 5, 2007

(65) Prior Publication Data

US 2007/0175462 A1 Aug. 2, 2007

Related U.S. Application Data

(62) Division of application No. 11/038,037, filed on Jan. 21, 2005, now Pat. No. 7,243,644.

(30) Foreign Application Priority Data

Jan. 23, 2004 (JP) ............................... 2004-16380
Nov. 26, 2004 (JP) ............................. 2004-341544
Nov. 26, 2004 (JP) ............................. 2004-341545

(51) Int. Cl.
*B60T 7/12* (2006.01)
*F02D 41/00* (2006.01)

(52) U.S. Cl. ........................ 701/109; 701/114; 123/673

(58) Field of Classification Search ................. 701/101, 701/103, 104, 108, 109, 114, 115; 123/672, 123/673, 674, 434, 703, 704
See application file for complete search history.

(56) References Cited

U.S. PATENT DOCUMENTS

| | | | | |
|---|---|---|---|---|
| 5,524,598 A | | 6/1996 | Hasegawa et al. | 123/672 |
| 5,600,056 A | | 2/1997 | Hasegawa et al. | |
| 5,657,736 A | | 8/1997 | Maki et al. | 123/673 |
| 5,715,796 A | | 2/1998 | Suzuki et al. | |
| 5,732,689 A | * | 3/1998 | Ohno et al. | 123/673 |
| 5,794,604 A | | 8/1998 | Suzuki et al. | |
| 5,806,012 A | * | 9/1998 | Maki et al. | 701/104 |
| 5,839,415 A | | 11/1998 | Suzuki et al. | |
| 5,911,682 A | * | 6/1999 | Kato et al. | 60/276 |
| 6,233,922 B1 | * | 5/2001 | Maloney | 60/276 |
| 6,990,402 B2 | * | 1/2006 | Yasui et al. | 701/108 |
| 7,162,862 B2 | * | 1/2007 | Nagai et al. | 60/285 |
| 2004/0158387 A1 | * | 8/2004 | Yasui et al. | 701/108 |

* cited by examiner

*Primary Examiner*—John T Kwon
(74) *Attorney, Agent, or Firm*—Nixon & Vanderhye P.C.

(57) ABSTRACT

An individual-cylinder air-fuel ratio estimation model is designed so as to consider the mixing of gases exhausted from adjacent combustion cylinders, and a movement by which a mixed gas arrives at the position of an air-fuel ratio sensor, in order that influences ascribable to the intervals (combustion intervals) of the adjacent combustion cylinders may be reflected on the estimation values of individual-cylinder air-fuel ratios. In evaluating the mixing of the gases which are exhausted from the adjacent combustion cylinders, there are considered the lengths and shapes of the exhaust manifolds of the respective combustion cylinders. In evaluating the movement by which the mixed gas arrives at the position of the air-fuel ratio sensor, there are considered a distance or volume from the confluence to the position of the air-fuel ratio sensor, and the exhaust gas quantities of the respective combustion cylinders.

7 Claims, 5 Drawing Sheets

APPARATUS FOR ESTIMATING AIR-FUEL RATIOS AND APPARATUS FOR CONTROLLING AIR-FUEL RATIOS OF INDIVIDUAL CYLINDERS IN INTERNAL COMBUSTION ENGINE

CROSS-REFERENCE TO RELATED APPLICATION

This application is a divisional of application Ser. No. 11/038,037, filed on Jan. 21, 2005, now U.S. Pat. No. 7,243,644 the content of which is incorporated herein by reference.

This application is based on Japanese patent applications No. 2004-16380 filed on Jan. 23, 2004, No. 2004-341544 filed on Nov. 26, 2004, and No. 2004-341545 filed on Nov. 26, 2004, the disclosures of which are incorporated herein by reference

FIELD OF THE INVENTION

The present invention relates to an individual-cylinder air-fuel ratio estimation apparatus and an individual-cylinder air-fuel ratio control apparatus for an internal combustion engine in which the air-fuel ratios of a plurality of cylinders of the internal combustion engine as have exhausted gases are estimated on the basis of the air-fuel ratios of the gases as detected by an air-fuel ratio sensor that is installed in a confluent exhaust pipe with the exhaust manifolds of the plurality of cylinders connected thereto.

BACKGROUND OF THE INVENTION

In recent years, in order to lessen the air-fuel ratio dispersion among the cylinders of an internal combustion engine and enhance an air-fuel ratio control precision, there has been proposed a technique wherein, as disclosed in Japanese Patent No. 3,217,680, a model describing the behavior of the exhaust system of the internal combustion engine is set, the detection value of a single air-fuel ratio sensor installed in a confluent exhaust pipe (the air-fuel ratio of gas flowing through the confluent exhaust pipe) is inputted to the model, and the air-fuel ratios of the individual cylinders (individual-cylinder air-fuel ratios) are estimated by an observer for observing the internal state of the confluent exhaust pipe, and also, the air-fuel ratios of the individual cylinders are feedback-controlled to target values on the basis of the estimation values.

In an internal combustion engine, for example, a v-type engine as includes a plurality of banks (cylinder groups), confluent exhaust pipes are disposed for the respective banks, and air-fuel ratio sensors are installed in the respective confluent exhaust pipes. With the construction, the air-fuel ratios of individual cylinders are estimated on the basis of the detection values of the corresponding air-fuel ratio sensor every bank. In this regard, however, the combustion intervals (intervals of exhaust strokes) of the plurality of cylinders disposed in one bank do not become equal intervals. The reason therefor will be explained by taking a V-type 8-cylinder engine as an example. The V-type 8-cylinder engine consists of two banks, in each of which four cylinders are disposed. When the whole engine (all of eight cylinders) is viewed, the combustion intervals are equal intervals (90° CA intervals). As shown in FIG. 2, however, when only the four cylinders #1, #3, #5 and #7 of one bank are viewed, the combustion intervals (intervals of the exhaust strokes) change in the three sorts of 90° CA, 180° CA and 270° CA, and hence, they become unequal intervals. In case of the long combustion interval (270° CA), gas arriving at the position of the air-fuel ratio sensor does not contain gas exhausted from any other combustion cylinder. In case of the short combustion interval (90° CA), however, it is considered that the air-fuel ratio will have changed due to the mixing of the gas exhausted from the other combustion cylinder, into the gas arriving at the position of the air-fuel ratio sensor.

Nevertheless, the individual-cylinder air-fuel ratio estimation model in the prior art has been built by modeling the behavior of the exhaust system of the engine whose combustion intervals become the equal intervals as in an engine having an exhaust system of one loop. Therefore, even when the model is applied to the V-type 8-cylinder engine or the like whose combustion intervals become the unequal intervals, there is the problem that the individual-cylinder air-fuel ratios cannot be precisely estimated.

Besides, in case of an exhaust system in which the lengths of the exhaust manifolds 12 of individual cylinders (hereinbelow, termed "exhaust pipe lengths") are unequal lengths as shown in FIG. 6, the distances of movements by which the exhaust gases of the individual cylinders arrive at an air-fuel ratio sensor 16 are different, and hence, the exhaust gases of the individual cylinders might fail to arrive at the air-fuel ratio sensor 16 in the order of combustions. Nevertheless, the individual-cylinder air-fuel ratio estimation model in the prior art has been built concerning the exhaust system in which the exhaust pipe lengths of the individual cylinders are identical. Accordingly, there is the problem that the individual-cylinder air-fuel ratios cannot be precisely estimated in the case of the exhaust system in which the exhaust pipe lengths of the individual cylinders are unequal.

SUMMARY OF THE INVENTION

In view of the above circumstances, an object of the present invention is to provide an individual-cylinder air-fuel ratio estimation apparatus for an internal combustion engine as can precisely estimate the air-fuel ratios of individual cylinders in both cases where combustion intervals are equal intervals and where they are unequal intervals, or even in case of an exhaust system in which the exhaust pipe lengths of the individual cylinders are unequal lengths.

Another object of the invention is to provide an individual-cylinder air-fuel ratio control apparatus for an internal combustion engine as can precisely control the air-fuel ratios of individual cylinders in both cases where combustion intervals are equal intervals and where they are unequal intervals, or even in case of an exhaust system in which the exhaust pipe lengths of the individual cylinders are unequal lengths.

In order to accomplish the first object, the invention consists in an individual-cylinder air-fuel ratio estimation apparatus for an internal combustion engine, comprising an air-fuel ratio sensor which is installed in a confluent exhaust pipe with exhaust manifolds of a plurality of cylinders of the internal combustion engine connected thereto; and individual-cylinder air-fuel ratio estimation means for estimating air-fuel ratios of the individual cylinders (hereinbelow, termed "individual-cylinder air-fuel ratios") having exhausted gases, on the basis of the air-fuel ratio of the mixed gas as detected by the air-fuel ratio sensor; the individual-cylinder air-fuel ratio estimation means causing influences, which are ascribable to intervals (hereinbelow, termed "combustion intervals") of the adjacent combustion cylinders, to be reflected on the estimation values of the individual-cylinder air-fuel ratios. Thus, in both cases where the combustion intervals are equal intervals and where they are unequal intervals, the individual-cylinder air-fuel ratios can be precisely estimated.

In this case, the mixing of the gases exhausted from the adjacent combustion cylinders, and a movement by which the mixed gas arrives at a position of said air-fuel ratio sensor, may be considered as the influences ascribable to the combustion intervals. By way of example, as the combustion interval becomes shorter, the degree of the mixing (overlap) of the gases exhausted from the adjacent combustion cylinders enlarges more, and a degree to which the air-fuel ratio of the gas of the preceding combustion cylinder changes toward that of the gas of the succeeding combustion cylinder enlarges more. Further, as the degree of the mixing (overlap) of the gases exhausted from the adjacent combustion cylinders enlarges more, the quantity of the gas flowing into the confluent exhaust pipe increases more to heighten the flow velocity of the gas and to shorten a time period in which the mixed gas arrives at the position of the air-fuel ratio sensor. Accordingly, the influences ascribable to the combustion intervals can be precisely evaluated by evaluating the mixing of the gases exhausted from the adjacent combustion cylinders, and the movement by which the mixed gas arrives at the position of the air-fuel ratio sensor.

Further, in evaluating the mixing of the gases exhausted from the adjacent combustion cylinders, the lengths of the exhaust manifolds of the respective combustion cylinders may be considered. Thus, even in an internal combustion engine which has exhaust manifolds of unequal lengths, the mixing of the gases exhausted from the adjacent combustion cylinders can be precisely evaluated.

Besides, in evaluating the mixing of the gases exhausted from the adjacent combustion cylinders, the shapes of the exhaust manifolds of the respective combustion cylinders may be considered. Thus, the mixing of the gases can be precisely evaluated in consideration of influence which the shape of the exhaust manifold exerts on gas collision (a gas flow behavior around the air-fuel ratio sensor).

Besides, in evaluating a movement by which the mixed gas arrives at the position of the air-fuel ratio sensor, a distance or volume from the confluence of the gases of the individual combustion cylinders to the position of said air-fuel ratio sensor, and the exhaust gas quantities of the respective combustion cylinders may be considered. Thus, a time period which is required for the gas to flow from the confluence of the gases of the individual combustion cylinders to the position of the air-fuel ratio sensor can be precisely decided, whereby the timing at which the gas of the air-fuel ratio indicated by the detection value of the air-fuel ratio sensor was exhausted can be precisely specified.

The invention may be applied to a construction in which the confluent exhaust pipes and the air-fuel ratio sensors are disposed for the respective cylinder groups of the internal combustion engine including the plurality of cylinder groups. In the internal combustion engine including the plurality of cylinder groups, when only one cylinder group is viewed, the combustion intervals become the unequal intervals. Therefore, the individual-cylinder air-fuel ratios cannot be precisely estimated with the individual-cylinder air-fuel ratio estimation method in the prior art. In contrast, when the invention is applied, the individual-cylinder air-fuel ratios can be precisely estimated even in the case where the combustion intervals become the unequal intervals.

Meanwhile, according to the invention, the individual-cylinder air-fuel ratio estimation means estimates the air-fuel ratios of the individual cylinders in consideration of the phase shifts of the air-fuel ratios of the individual cylinders attributed to the differences of the combustion intervals, in estimating the air-fuel ratios of the individual cylinders by employing a model which represents the relations between the air-fuel ratios of the individual cylinders and the detection values of the air-fuel ratio sensor in the order of combustions. Thus, even when the function of compensating for the phase shifts of the air-fuel ratios of the individual cylinders attributed to the differences of the combustion intervals is not contained in the individual-cylinder air-fuel ratio estimation model itself, the air-fuel ratios of those individual cylinders of the internal combustion engine whose combustion intervals are unequal intervals can be precisely estimated using the model.

Besides, in a system wherein the internal combustion engine includes a plurality of cylinder groups, the exhaust manifolds of the plurality of cylinders whose combustion intervals are the unequal intervals are connected to the confluent exhaust pipes for the respective cylinder groups, and the air-fuel ratio sensors are installed in the respective confluent exhaust pipes; the air-fuel ratios of the individual cylinders may be estimated in consideration of the phase shifts of the air-fuel ratios of the individual cylinders attributed to the differences of the combustion intervals, in estimating the air-fuel ratios of the individual cylinders by employing the model for the respective cylinder groups. In the internal combustion engine including the plurality of cylinder groups, when only one cylinder group is viewed, the combustion intervals become the unequal intervals. Therefore, the air-fuel ratios of the individual cylinders cannot be precisely estimated with the individual-cylinder air-fuel ratio estimation method in the prior art. In contrast, when the invention is applied, the air-fuel ratios of those individual cylinders of the cylinder groups whose combustion intervals become the unequal intervals can be precisely estimated.

Further, the model for estimating the air-fuel ratios of the individual cylinders may be built so as to be capable of estimating the air-fuel ratios of the individual cylinders at intervals shorter than the combustion intervals, under an assumption that the combustion intervals be equal intervals. Thus, the model can be easily created, and the phase shifts of the air-fuel ratios of the individual cylinders attributed to the differences of the combustion intervals can be precisely compensated for.

Meanwhile, according to the invention, a plurality of individual-cylinder air-fuel ratio estimation models are created by modeling the relations between the air-fuel ratios of the individual cylinders and the detection values of the air-fuel ratio sensor, separately for the respective cylinders, and the air-fuel ratios of the individual cylinders are estimated by employing the individual-cylinder air-fuel ratio estimation models which are different for the respective cylinders. Thus, even in the case of the combustion intervals which are unequal intervals (hereinbelow, termed "unequal-interval combustions"), or the exhaust system in which the lengths of the exhaust pipes of the individual cylinders are unequal lengths (hereinbelow, termed "unequal-length exhaust system"), the individual-cylinder air-fuel ratio estimation models for estimating the air-fuel ratios of the individual cylinders can be built in consideration of the influences of the unequal-interval combustions or the unequal-length exhaust system, separately for the respective cylinders, and hence, the air-fuel ratios of the individual cylinders can be precisely estimated even in the case of the unequal-interval combustions or the unequal-length exhaust system.

Each of the individual-cylinder air-fuel ratio estimation models of the individual cylinders for use in the invention may be built so as to receive as its input the combination between the air-fuel ratio of the predetermined cylinder whose air-fuel ratio is to be estimated, and disturbance elements. Thus, each individual-cylinder air-fuel ratio estimation model can be built with the influences of the unequal-interval combustions or the unequal-length exhaust system contained in the disturbance elements, and the individual-cylinder air-fuel ratio estimation models different for the respective cylinders can be created comparatively easily.

In this case, the disturbance element may well be represented by the mean value of the air-fuel ratios of all the cylinders, or by the mean value of the air-fuel ratios of the cylinders except the predetermined cylinder whose air-fuel ratio is to be estimated. In either case, there is the advantage that the disturbance element (the influence of the unequal-interval combustions or the unequal-length exhaust system) can be calculated with ease.

Besides, the individual-cylinder air-fuel ratio estimation models may be built separately for the respective cylinders by employing model parameters which are separate for the respective cylinders. Thus, the individual-cylinder air-fuel ratio estimation models which are different for the respective cylinders can be created with ease.

According to the invention, in a system wherein the internal combustion engine includes a plurality of cylinder groups, the exhaust manifolds of the plurality of cylinders whose combustion intervals are the unequal intervals are connected to the confluent exhaust pipes for the respective cylinder groups, and the air-fuel ratio sensors are installed in the respective confluent exhaust pipes; the air-fuel ratios of the individual cylinders may be estimated by employing the individual-cylinder air-fuel ratio estimation models which are different for the respective cylinders of each of the cylinder groups. In the internal combustion engine including the plurality of cylinder groups, when only one cylinder group is viewed, the combustion intervals become the unequal intervals. Therefore, the air-fuel ratios of the individual cylinders cannot be precisely estimated with the individual-cylinder air-fuel ratio estimation method in the prior art. In contrast, when the invention is applied, the air-fuel ratios of those individual cylinders of the cylinder groups whose combustion intervals become the unequal intervals can be precisely estimated. Of course, even in the case of the unequal-length exhaust system, the air-fuel ratios of the individual cylinders can be precisely estimated.

Besides, an individual-cylinder air-fuel ratio control apparatus for an internal combustion engine may be constructed comprising the individual-cylinder air-fuel ratio estimation apparatus for the internal combustion engine, and individual-cylinder air-fuel ratio control means for controlling the air-fuel ratios of the individual cylinders in the direction of decreasing the inter-cylinder dispersion of the individual-cylinder air-fuel ratios estimated by the individual-cylinder air-fuel ratio estimation apparatus. Thus, even in the case of the unequal-interval combustions or the unequal-length exhaust system, the individual-cylinder air-fuel ratios can be precisely controlled.

DETAILED DESCRIPTION OF EMBODIMENTS

First Embodiment

There will now be described an embodiment in which the present invention is applied to, for example, a V-type 8-cylinder engine.

Figure 1:
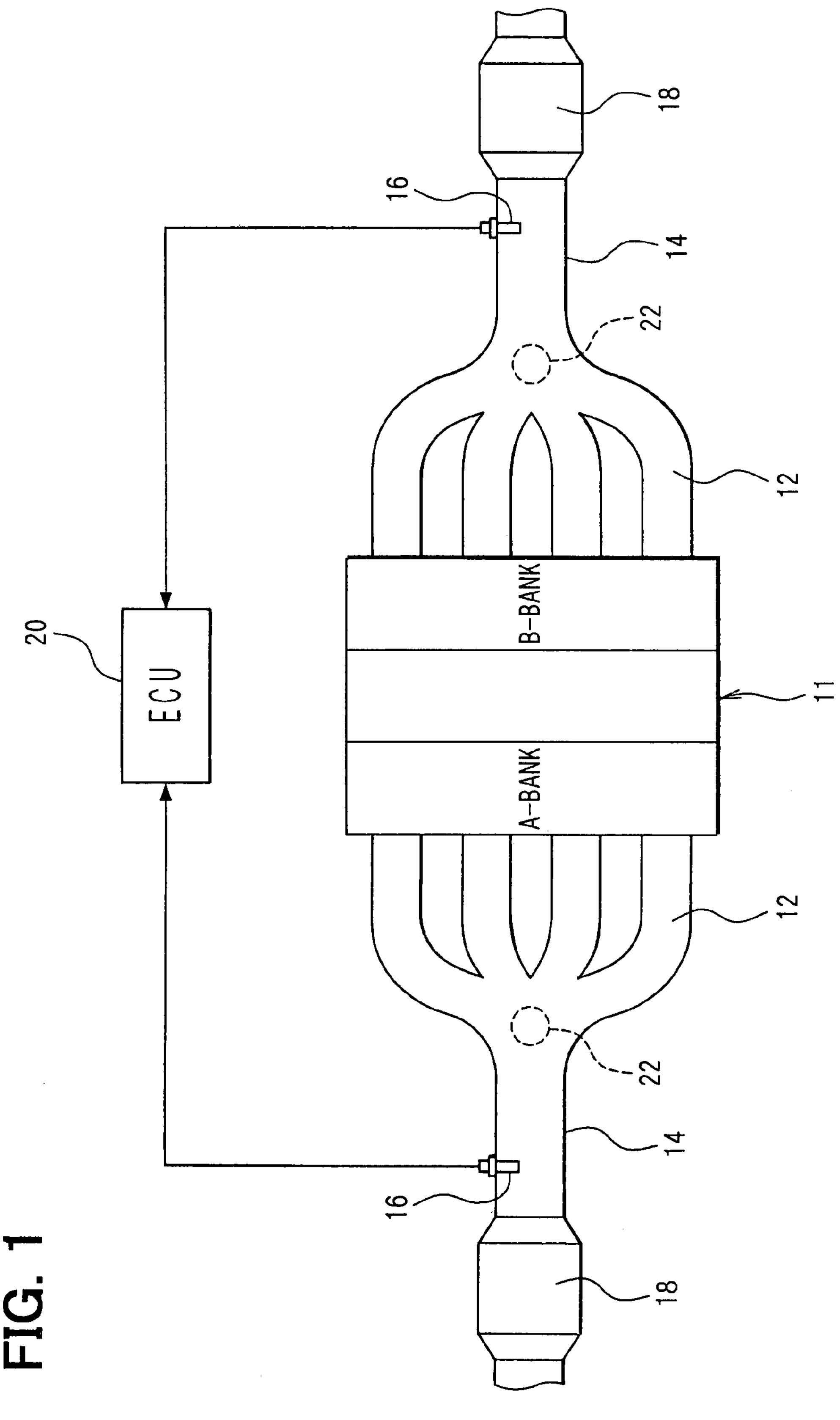
FIG. 1 is a schematic constructional view of an engine exhaust system in an embodiment of the present invention.

First, the construction of the exhaust system of a V-type 8-cylinder engine will be described with reference to FIG. 1. The V-type 8-cylinder engine 11 is such that each of two banks (A-bank and B-bank) is formed in a V-shape, and that four cylinders #1, #3, #5 and #7 are arranged in series within the A-bank, while the remaining four cylinders #2, #4, #6 and #8 are arranged in series within the B-bank. Individual exhaust systems are respectively constructed for the A-bank and B-bank, and the exhaust manifolds 12 of the banks, each having four exhaust manifolds, are respectively connected to individual confluent exhaust pipes 14. Air-fuel ratio sensors 16 each of which detects the air-fuel ratio of exhaust gas, are installed in the confluent exhaust pipes 14 of the respective banks. A catalyst 18 for purifying the exhaust gas is disposed downstream of the corresponding air-fuel ratio sensor 16.

The outputs of various sensors such as the air-fuel ratio sensors 16 are inputted to an engine control unit (ECU) 20. The ECU 20 is chiefly configured of a microcomputer, and it executes various engine control programs stored in a built-in ROM (storage medium), thereby to control the fuel injection quantities and ignition timings of the individual cylinders in accordance with engine operation states.

In this embodiment, the ECU 20 executes routines for controlling the air-fuel ratios of the individual cylinders as will be described later, whereby the individual-cylinder air-fuel ratios of the banks (the air-fuel ratios of the respective cylinders) are estimated on the basis of the detection values of the air-fuel ratios 16 of the banks (the actual air-fuel ratios of the exhaust gases flowing through the confluent exhaust pipes 14 of the banks) by employing an individual-cylinder air-fuel ratio estimation model to be explained later, the mean values of the individual-cylinder air-fuel ratio estimation values are calculated for the respective banks, and the mean values are set as reference air-fuel ratios (as the target air-fuel ratios of the banks). Besides, the deviations between the individual-cylinder air-fuel ratio estimation values and the reference air-fuel ratio are calculated for the respective cylinders of each bank, individual-cylinder correction quantities (fuel correction quantities of the cylinders) are calculated so as to decrease the deviations (air-fuel ratio dispersion among the individual cylinders), and the individual-cylinder fuel injection quantities are corrected on the basis of the calculated results. Thus, the air-fuel ratios of mixtures to be fed into the cylinders are corrected for the respective cylinders, so as to lessen the air-fuel ratio dispersion among the cylinders. (Hereinbelow, such a control shall be termed “individual-cylinder air-fuel ratio”.)

Here, there will be described a practicable example of a model (hereinbelow, termed “individual-cylinder air-fuel ratio estimation model”) in which the individual-cylinder air-fuel ratios of the respective banks are estimated on the basis of the detection values of the air-fuel ratio sensors 16 of the banks (the actual air-fuel ratios of the exhaust gases flowing through the confluent exhaust pipes 14 of the banks).

Figure 2:
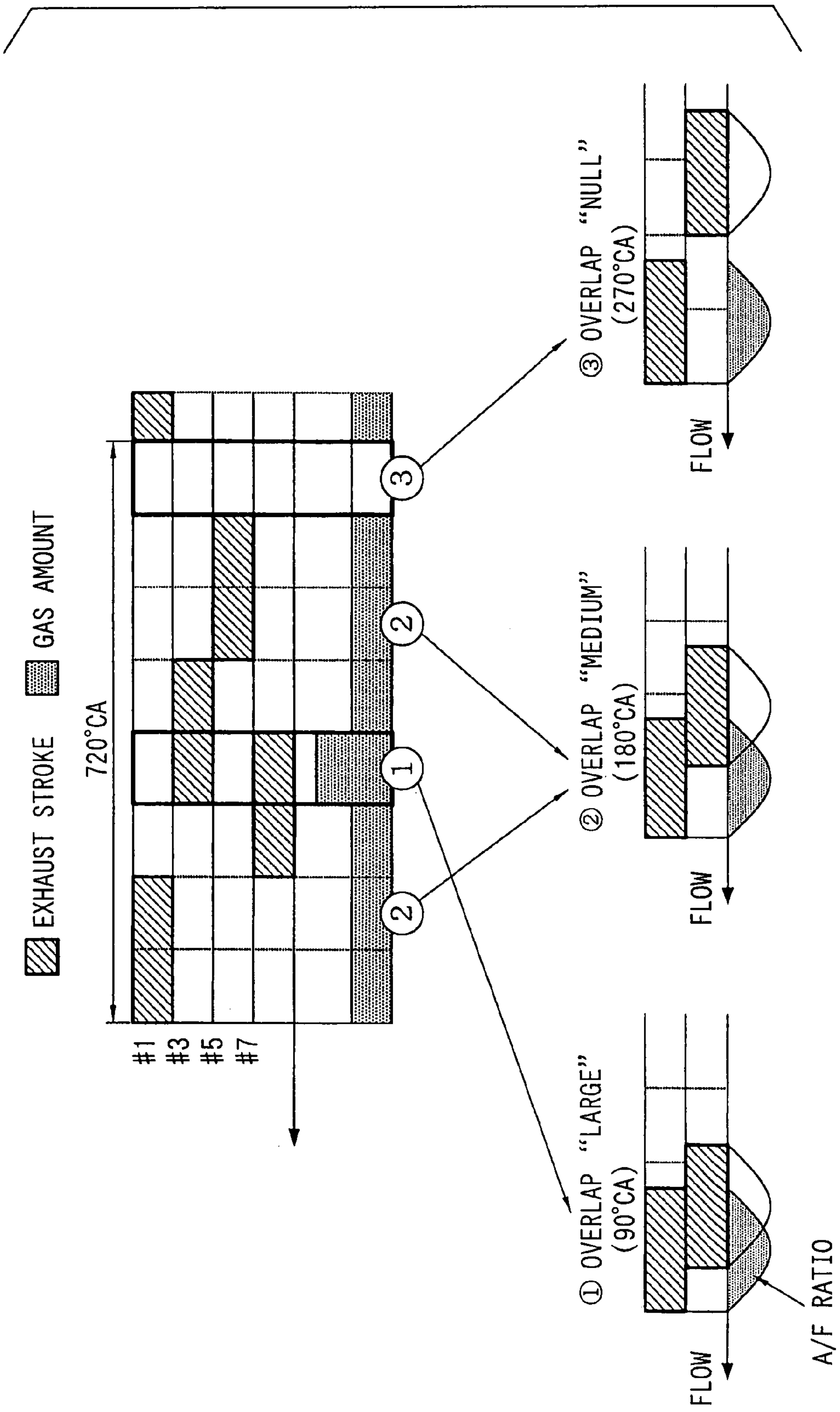
FIG. 2 is a diagram for explaining the overlaps of the exhaust gases of adjacent combustion cylinders.

When the V-type 8-cylinder engine 11 is viewed as a whole (when all the eight cylinders are viewed), the intervals of the adjacent combustion cylinders (hereinbelow, termed "combustion intervals") are equal intervals (90° CA intervals). As shown in FIG. 2, however, when only the four cylinders #1, #3, #5 and #7 of one bank (bank-A) are viewed, the combustion intervals (the intervals of exhaust strokes) change as the three intervals of 90° CA, 180° CA and 270° CA, and hence, they become unequal intervals. In case of the long combustion interval (in case of 270° CA), the gas exhausted from the other combustion cylinder does not mix in the gas arriving at the position of the air-fuel ratio sensor 16, but in case of the short combustion interval (in case of 90° CA), the gas exhausted from the other combustion cylinder will mix in the gas arriving at the position of the air-fuel ratio sensor 16, to change the air-fuel ratio.

Therefore, the individual-cylinder air-fuel ratio estimation model of this embodiment is designed so as to consider the mixing (overlap) of the gases exhausted from the adjacent combustion cylinders, and the movement of the mixed gas till the arrival at the position of the air-fuel ratio sensor 16, in order that influences ascribable to the combustion intervals may be reflected on the estimation values of the individual-cylinder air-fuel ratios. The mixing of the gases exhausted from the adjacent combustion cylinders occurs at a confluence 22 at which the four exhaust manifolds 12 of each bank join, and the gases mixed at the confluence 22 flow to the position of the air-fuel ratio sensor 16 by which the air-fuel ratio is detected.

By way of example, as the combustion interval becomes shorter, the degree of the mixing (overlap) of the gases exhausted from the adjacent combustion cylinders enlarges more, and a degree to which the air-fuel ratio of the gas of the preceding combustion cylinder changes toward that of the gas of the succeeding combustion cylinder enlarges more. Further, as the degree of the mixing (overlap) of the gases exhausted from the adjacent combustion cylinders enlarges more, the quantity of the gas flowing through the confluent exhaust pipe 14 increases more to heighten the flow velocity of the gas and to shorten a time period in which the mixed gas arrives from the confluence 22 at the position of the air-fuel ratio sensor 16. Accordingly, the influences ascribable to the combustion intervals can be precisely evaluated by evaluating the mixing of the gases exhausted from the adjacent combustion cylinders, and the movement by which the mixed gas arrives from the confluence 22 at the position of the air-fuel ratio sensor 16.

In evaluating the mixing of the gases exhausted from the adjacent combustion cylinders, the lengths and shapes of the exhaust manifolds 12 of the individual combustion cylinders shall be considered. When the lengths of the exhaust manifolds 12 are considered, the mixing of the gases exhausted from the adjacent combustion cylinders can be precisely evaluated even in an engine which has exhaust manifolds 12 of unequal lengths. Besides, when the shapes of the exhaust manifolds 12 are considered, the mixing of the gases can be precisely evaluated in consideration of influence which the shape of the exhaust manifold 12 exerts on gas collision (a gas flow behavior around the air-fuel ratio sensor 16).

Concretely, the mixing of the gases at the confluence 22 is modeled by the following formula:

$$\lambda a(j+1)=\alpha(j)\cdot\lambda(j)+\{1-\alpha(j)\}\cdot\lambda a(j) \tag{1}$$

Here, λa denotes the air-fuel ratio of the mixed gas at the confluence 22, λ denotes the air-fuel ratio of that exhaust gas of the cylinder which is mixed into the gas of the confluence 22, and α denotes the mixing proportion of that exhaust gas of the cylinder which is mixed into the gas of the confluence 22. (j) signifies a value at the calculation timing of the current time, and (j+1) signifies a value at the calculation timing of the next time.

Besides, in evaluating the movement by which the mixed gas arrives from the confluence 22 at the position of the air-fuel ratio sensor 16, a distance or volume from the confluence 22 to the position of the air-fuel ratio sensor 16, and the exhaust gas quantity of each combustion cylinder shall be considered. Thus, the time period which is required for the gas to flow from the confluence 22 to the position of the air-fuel ratio sensor 16 can be precisely decided, whereby the timing at which the gas of the air-fuel ratio indicated by the detection value of the air-fuel ratio sensor 16 was exhausted can be precisely specified.

Concretely, the movement by which the mixed gas arrives from the confluence 22 at the position of the air-fuel ratio sensor 16 is modeled by the following formula:

$$\lambda s(i)=\lambda a(i-Vex/Vcy-\beta) \tag{2}$$

Here, λs denotes the detection value of the air-fuel ratio sensor 16, β denotes a parameter for considering the overlap (mixing) of a gas quantity based on the combustion intervals, Vex denotes the volume from the confluence 22 to the position of the air-fuel ratio sensor 16, Vcy denotes the exhaust gas quantity (cylinder volume) of each cylinder, and i denotes the calculation timing of this time. Vex/Vcy becomes a parameter for considering the volume from the confluence 22 to the position of the air-fuel ratio sensor 16, and the exhaust gas quantity of each combustion cylinder.

λa(i−Vex/Vcy−β) signifies λa at the point of time which went back (Vex/Vcy+β) to the past with respect to the present time (i). The parameter β for considering the overlap of the gas quantities based on the combustion intervals is previously set in accordance with the overlapping degree of the gas quantities of the adjacent combustion cylinders. In this embodiment, as shown in FIG. 2, the overlaps of the gas quantities based on the combustion intervals are classified into three sorts (overlap "large", overlap "medium", and overlap "null"). The parameter β is set at β=−1 for the overlap "large", at β=0 for the overlap "medium", and at β=1 for the overlap "null". This is for considering the circumstances that, as the overlap of the gas quantities of the adjacent combustion cylinders enlarges more, the quantity of the gas flowing from the confluence 22 into the confluent exhaust pipe 14 increases more to heighten the flow velocity of the gas and to shorten the time period in which the gas arrives from the confluence 22 at the position of the air-fuel ratio sensor 16.

The models of the mixing of the gases at the confluence 22 and the movement of the mixed gas to the position of the air-fuel ratio sensor 16 are put together into a formula given below, thereby to build the individual-cylinder air-fuel ratio estimation model. The individual-cylinder air-fuel ratios are estimated using the individual-cylinder air-fuel ratio estimation model. Incidentally, a Kalman filter is employed as an observer.

$$\lambda s(i+1)=\sum_{n=1}^{4}\alpha n(i-Vex/Vcy-\beta)\cdot\lambda n+\left\{1-\sum_{n=1}^{4}\alpha n(i-Vex/Vcy-\beta)\right\}\cdot\lambda s(i) \tag{3}$$

$$\alpha n(i)=Cn\times rn(i)\Big/\sum_{n=1}^{4}rn(i)$$

$$\beta=-1,0,1$$

Here, λn denotes the individual-cylinder air-fuel ratio of the cylinder #n, αn denotes the mixing proportion of that exhaust gas of the cylinder #n which is mixed into the gas of the confluence 22, Cn denotes a parameter for considering influence which is exerted on the mixed gas by the shape of the exhaust manifold 12 of the cylinder #n, and rn denotes a parameter for considering influence which is exerted on the mixed gas by the length of the exhaust manifold 12 of the cylinder #n.

When the above formula (3) is transformed into state space models, the following formulae (4a) and (4b) are derived:

$$X(i+1)=A\cdot X(i)+B\cdot u(i)+W(i) \tag{4a}$$

$$Y(i)=C\cdot X(i)+D\cdot u(i) \tag{4b}$$

Here, A, B, C and D denote the parameters of the models, Y denotes the detection value of the air-fuel ratio sensor 16, X denotes the summation of the influences of the individual-cylinder air-fuel ratio being a state variable, and W denotes noise.

Further, when the Kalman filter is designed in conformity with the above formulae (4a) and (4b), the following formula (5) is obtained:

$$X^{\wedge}(k+1|k)=A\cdot X^{\wedge}(k|k-1)+K\{Y(k)-C\cdot A\cdot X^{\wedge}(k|k-1)\} \tag{5}$$

Here, X^ (X hat) denotes the estimation value of the summation of the influences of the individual-cylinder air-fuel ratio, and K denotes a Kalman gain. The significance of X^(k+1|k) is to find the estimation value of a time period (k+1) on the basis of the estimation value of a time period (k).

In the above way, the individual-cylinder air-fuel ratio estimation model is built by the Kalman filter type observer, whereby the summations of the influences of the individual-cylinder air-fuel ratios can be successively estimated with the proceeding of the combustion cycle. The individual-cylinder air-fuel ratio can be estimated by the inverse transformation of Formula (3).

Figure 3:
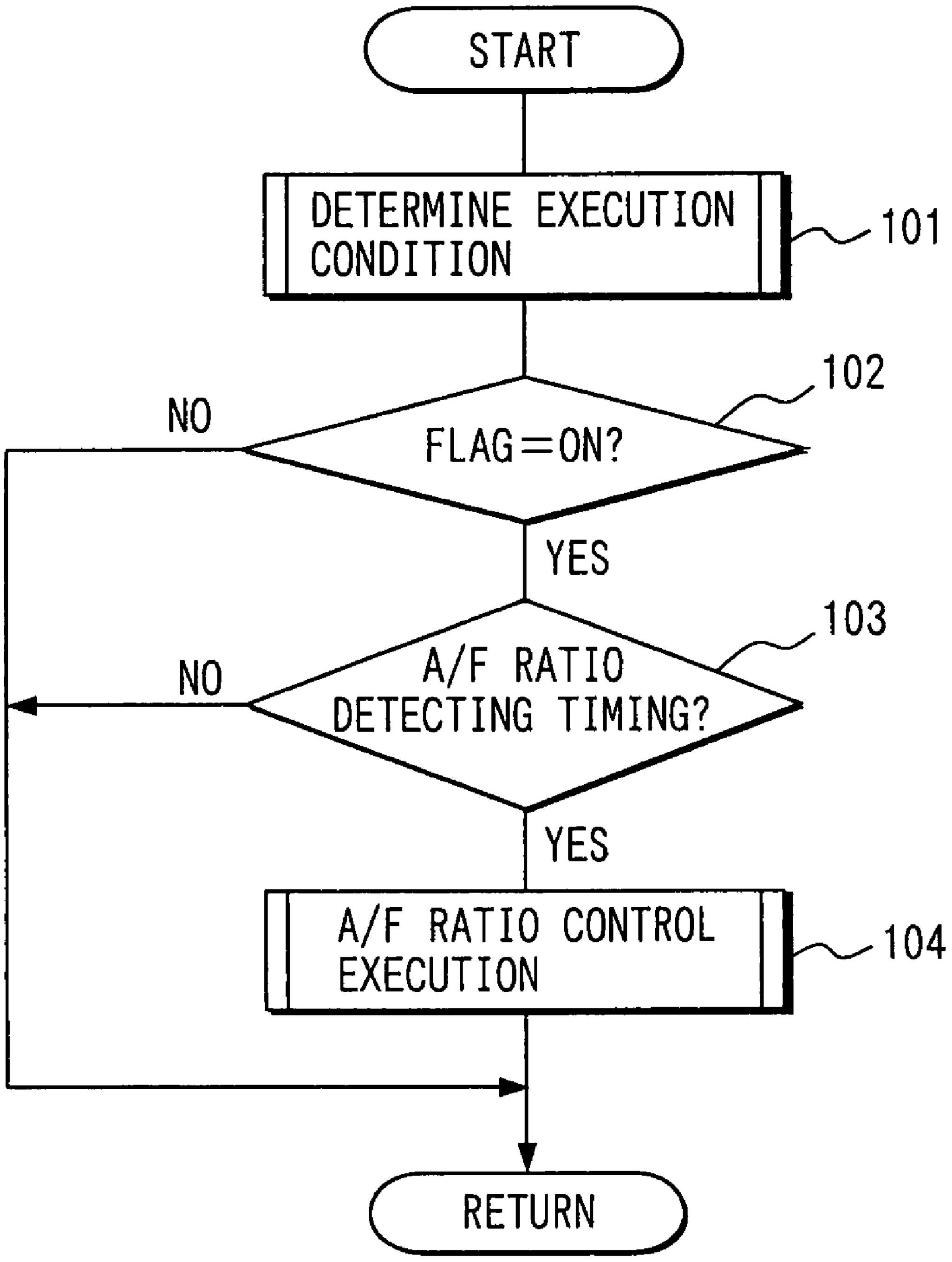
FIG. 3 is a flow chart showing the processing flow of the main routine of an individual-cylinder air-fuel ratio control.
Figure 4:
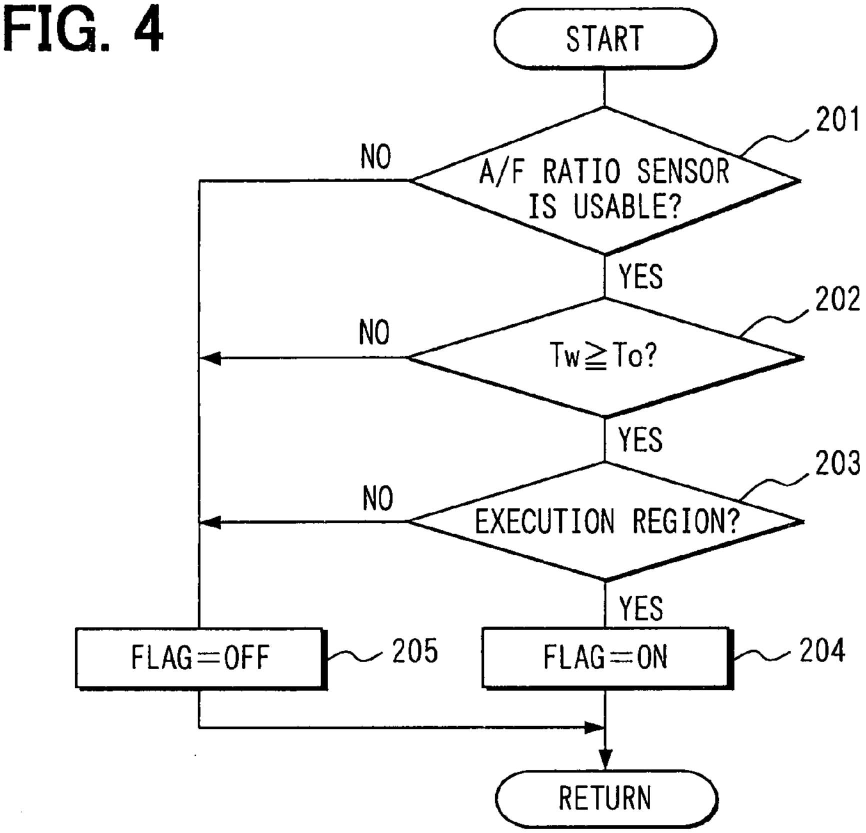
FIG. 4 is a flow chart showing the processing flow of an execution-condition decision routine.
Figure 5:
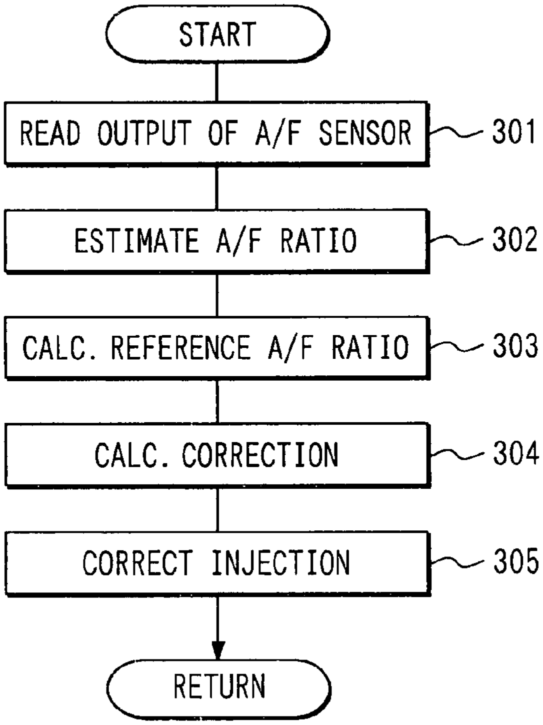
FIG. 5 is a flow chart showing the processing flow of an individual-cylinder air-fuel ratio control execution routine.

The ECU 20 executes routines for controlling the air-fuel ratios of the individual cylinders as shown in FIGS. 3 through 5, thereby to estimate the individual-cylinder air-fuel ratios of each bank on the basis of the detection values of the air-fuel ratio sensor 16 of each bank in accordance with the individual-cylinder air-fuel ratio estimation model, and to perform the individual-cylinder air-fuel ratio control for correcting the fuel injection quantities of the individual cylinders so that the air-fuel ratio dispersion among the cylinders may be lessened every bank. The processing contents of the routines will be described below.

[Main Routine of Individual-Cylinder Air-Fuel Ratio Control]

The main routine of an individual-cylinder air-fuel ratio control as shown in FIG. 3 is activated every predetermined crank angle (for example, every 30° CA) in synchronism with the output pulse of a crank angle sensor (not shown). When the routine is activated, an execution-condition decision routine in FIG. 4 to be explained later is first executed at a step 101, so as to decide whether or not the execution condition of the individual-cylinder air-fuel ratio control holds. Thereafter, the routine proceeds to a step 102, at which whether or not the execution condition of the individual-cylinder air-fuel ratio control holds is decided depending upon whether or not an execution flag set by the execution-condition decision routine in FIG. 4 is "ON". Subject to the resulting decision that the execution flag is "OFF" (that the execution condition does not hold), the routine is ended without performing any subsequent processing.

On the other hand, in a case where the execution flag has been decided "ON" (where it has been decided that the execution condition holds), the routine proceeds to a step 103, which decides whether or not a current crank angle is the air-fuel ratio detection timing of each cylinder (the sampling timing of the output of the air-fuel ratio sensor 16). If the current crank angle is not the air-fuel ratio detection timing, the routine is ended without performing any subsequent processing.

In contrast, if the current crank angle is the air-fuel ratio detection timing, the routine proceeds to a step 104, at which an individual-cylinder air-fuel ratio control execution routine in FIG. 5 to be explained later is activated so as to execute the individual-cylinder air-fuel ratio control.

[Execution-Condition Decision Routine]

The execution-condition decision routine in FIG. 4 is a subroutine which is executed at the step 101 of the main routine of the individual-cylinder air-fuel ratio control as shown in FIG. 3. When the execution-condition decision routine is activated, whether or not the air-fuel ratio sensor 16 is in a usable state is first decided at a step 201. Here, the "usable state" indicates, for example, that the air-fuel ratio sensor 16 is in an active state and that it has no fault. If the air-fuel ratio sensor 16 is not in the usable state, the routine is ended without performing any subsequent processing.

On the other hand, if the air-fuel ratio sensor 16 is in the usable state, the routine proceeds to a step 202, which decides whether or not a cooling-water temperature Tw is at or above a predetermined temperature To (the engine 11 is in a warmed-up state). If the cooling-water temperature Tw is below the predetermined temperature To, the routine is ended without performing any subsequent processing. If the cooling-water temperature Tw is, at least, the predetermined temperature To, the routine proceeds to a step 203, at which whether or not a current engine operation region is the execution region of the individual-cylinder air-fuel ratio control is decided by referring to an operation region map whose parameters are an engine revolution speed and a load (for example, an intake pipe pressure). In a high revolution speed region or a low load region, the estimation precision of the individual-cylinder air-fuel ratio is inferior, and hence, the individual-cylinder air-fuel ratio control is forbidden.

If the current engine operation region is the execution region of the individual-cylinder air-fuel ratio control, the routine proceeds to a step 204, at which the execution flag is set at "ON", and if not, the routine proceeds to a step 205, at which the execution flag is set at "OFF".

[Individual-Cylinder Air-fuel Ratio Control Execution Routine]

The individual-cylinder air-fuel ratio control execution routine in FIG. 5 is a subroutine which is executed at the step 104 of the main routine of the individual-cylinder air-fuel ratio control as shown in FIG. 3. When the individual-cylinder air-fuel ratio control execution routine is activated, the output (air-fuel ratio detection value) of the air-fuel ratio sensor 16 is first loaded at a step 301. At the next step 302, the air-fuel ratio of the cylinder whose air-fuel ratio is to be estimated at the current time is estimated on the basis of the detection value of the air-fuel ratio sensor 16 by employing the individual-cylinder air-fuel ratio estimation model described before. The processing of the step 302 plays the role of individual-cylinder air-fuel ratio estimation means. Thereafter, the routine proceeds to a step 303, at which the mean value of the estimated air-fuel ratios of all the cylinders is calculated and is set as a reference air-fuel ratio (the target air-fuel ratio of all the cylinders).

Thereafter, the routine proceeds to a step 304, at which the deviations between the estimated air-fuel ratios of the individual cylinders and the reference air-fuel ratio are calculated, and individual-cylinder correction quantities are also calculated so as to decrease the deviations. Subsequently, the routine proceeds to a step 305, at which individual-cylinder fuel injection quantities are corrected on the basis of the individual-cylinder correction quantities. Thus, the air-fuel ratios of mixtures to be fed into the individual cylinders are corrected for the respective cylinders, to perform the control so that the air-fuel ratio dispersion among the cylinders may be lessened.

According to the first embodiment thus far described, in estimating the individual-cylinder air-fuel ratio, there are considered the mixing of the gases exhausted from the adjacent combustion cylinders, and the movement by which the mixed gas arrives at the position of the air-fuel ratio sensor 16. Therefore, the influences ascribable to the combustion intervals can be precisely reflected on the estimation values of the individual-cylinder air-fuel ratios, and the individual-cylinder air-fuel ratios can be precisely estimated.

Incidentally, the invention is not restricted to the V-type engine, but it is also applicable to a straight type engine, a horizontal opposition type engine, etc. Besides, it is applicable, not only to the engine whose exhaust system has the two loops, but also to an engine whose exhaust system has a single loop.

Second Embodiment

In this embodiment, in estimating the air-fuel ratio of each cylinder by employing an individual-cylinder air-fuel ratio estimation model which estimates the air-fuel ratio of each cylinder, the air-fuel ratio of each cylinder is estimated in consideration of the phase shift of the air-fuel ratio of each cylinder attributed to the difference of combustion intervals (unequal-interval combustions). Accordingly, the function of compensating for the phase shift of the air-fuel ratio of each cylinder attributed to the difference of the combustion intervals (unequal-interval combustions) is not incorporated in the individual-cylinder air-fuel ratio estimation model itself.

The individual-cylinder air-fuel ratio estimation model is a model which represents the relations between the air-fuel ratios of the individual cylinders and the detection values of the air-fuel ratio sensor 16 in the order of combustions. Assuming the combustion intervals to be equal intervals, the model is built so as to be capable of estimating the individual-cylinder air-fuel ratios at intervals (90° CA) which are ½ of the combustion intervals (180° CA).

The individual-cylinder air-fuel ratio estimation model is given by the following formula:

$$y_s(i) = \sum_{j=1}^{8} a_j \cdot y_s(i-j) + \sum_{j=1}^{8} b_j \cdot u(i-j) \tag{6}$$

$$u = [\,u_1 \;\; u_1 \;\; u_7 \;\; u_7 \;\; u_3 \;\; u_3 \;\; u_5 \;\; u_5\,]^T \tag{7}$$

Here, $y_s$ denotes the detection value of the air-fuel ratio sensor 16, u denotes the input air-fuel ratio of each cylinder ($u_1$ denotes the input air-fuel ratio of the cylinder #1, $u_3$ denotes the input air-fuel ratio of the cylinder #3, $u_5$ denotes the input air-fuel ratio of the cylinder #5, and $u_7$ denotes the input air-fuel ratio of the cylinder #7), and $a_j$ and $b_j$ denote model parameters. "i" denotes a current calculation timing, and "j" denotes how many times a calculation timing precedes the current calculation timing i. In this embodiment, the calculation interval is set at the interval(90° CA) being ½ of the combustion interval (180° CA), and hence, j changes from 1 to 8 per cycle (720° CA).

$$\text{Maximum value of } j = 720°\ \text{CA}/90°\ \text{CA} = 8$$

When the formulae of the individual-cylinder air-fuel ratio estimation model are transformed into state space models, the following formulae (8) and (9) are derived:

$$X(i+1) = A \cdot X(i) + B \cdot u(i) + W(i) \tag{8}$$

$$Y(i) = C \cdot X(i) + D \cdot u(i) \tag{9}$$

Here, A, B, C and D denote the parameters of the individual-cylinder air-fuel ratio estimation model, Y denotes the detection value of the air-fuel ratio sensor 16, X denotes the summation of the influences of the individual-cylinder air-fuel ratio being a state variable, and W denotes noise.

Further, when a Kalman filter is designed in conformity with the above formulae (8) and (9), the following formula (10) is obtained:

$$X^\wedge(k+1|k) = A \cdot X^\wedge(k|k-1) + K\{Y(k) - C \cdot A \cdot X^\wedge(k|k-1)\} \tag{10}$$

Here, X^(X hat) denotes the estimation value of the summation of the influences of the individual-cylinder air-fuel ratio, and K denotes a Kalman gain. The significance of X^(k+1|k) is to find the estimation value of a time period (k+1) on the basis of the estimation value of a time period (k).

In the above way, the individual-cylinder air-fuel ratio estimation model is built by the Kalman filter type observer, whereby the summations of the influences of the individual-cylinder air-fuel ratios can be successively estimated with the proceeding of the combustion cycle. By the way, in a case where an input is an air-fuel ratio deviation, an output Y in the above formula (10) is replaced with an air-fuel ratio deviation.

Here, in order to consider the overlap of exhaust gases attributed to the unequal-interval combustions, the phase shift corresponding to the combustion interval is considered in the estimation value X^(X hat) of the summation of the influences of the individual-cylinder air-fuel ratio, whereby the following formulae are obtained:

$$u^\wedge(i) = X^\wedge(i-\beta)$$

$$\beta = -1, 0, 1$$

In these formulae, β denotes a parameter for considering the overlap of the exhaust gases attributed to the unequal-interval combustions, and it is previously set in accordance with the overlapping degree of the gas quantities of the adjacent combustion cylinders. In this embodiment, as shown in FIG. 2, the overlaps of the gas quantities based on the combustion intervals are classified into three sorts (overlap "large", overlap "medium", and overlap "null"). The parameter β is set at β=−1 for the overlap "large", at β=0 for the overlap "medium", and at β=1 for the overlap "null". This is for considering the circumstances that, as the overlap of the gas quantities of the adjacent combustion cylinders enlarges more, the quantity of the gas flowing from the confluence 22 into the confluent exhaust pipe 14 increases more to heighten the flow velocity of the gas and to shorten the time period in which the gas arrives from the confluence 22 at the position of the air-fuel ratio sensor 16.

As in the first embodiment, the ECU 20 executes the routines for controlling the air-fuel ratios of the individual cylinders as shown in FIGS. 3 through 5, whereby in estimating the individual-cylinder air-fuel ratios of each bank on the basis of the detection values of the air-fuel ratio sensor 16 of each bank in accordance with the individual-cylinder air-fuel ratio estimation model, the individual-cylinder air-fuel ratios of each bank are estimated in consideration of the phase shifts of the air-fuel ratios of the individual cylinders attributed to the differences of the combustion intervals (unequal-interval combustions), and the individual-cylinder air-fuel ratio control is performed for correcting the fuel injection quantities of the individual cylinders so that the air-fuel ratio dispersion among the cylinders may be lessened every bank.

According to the second embodiment thus far described, in estimating the air-fuel ratios of the individual cylinders by employing the individual-cylinder air-fuel ratio estimation model which represents the relations between the air-fuel ratios of the individual cylinders and the detection values of the air-fuel ratio sensor 16 in the order of combustions, the air-fuel ratios of the individual cylinders are estimated in consideration of the phase shifts of the air-fuel ratios of the individual cylinders attributed to the differences of the combustion intervals. Therefore, even when the function of compensating for the phase shifts of the air-fuel ratios of the individual cylinders attributed to the unequal-interval combustions is not contained in the individual-cylinder air-fuel ratio estimation model itself, the air-fuel ratios of those individual cylinders of the engine 11 whose combustion intervals are unequal intervals can be precisely estimated using the individual-cylinder air-fuel ratio estimation model.

Third Embodiment

Figure 6:
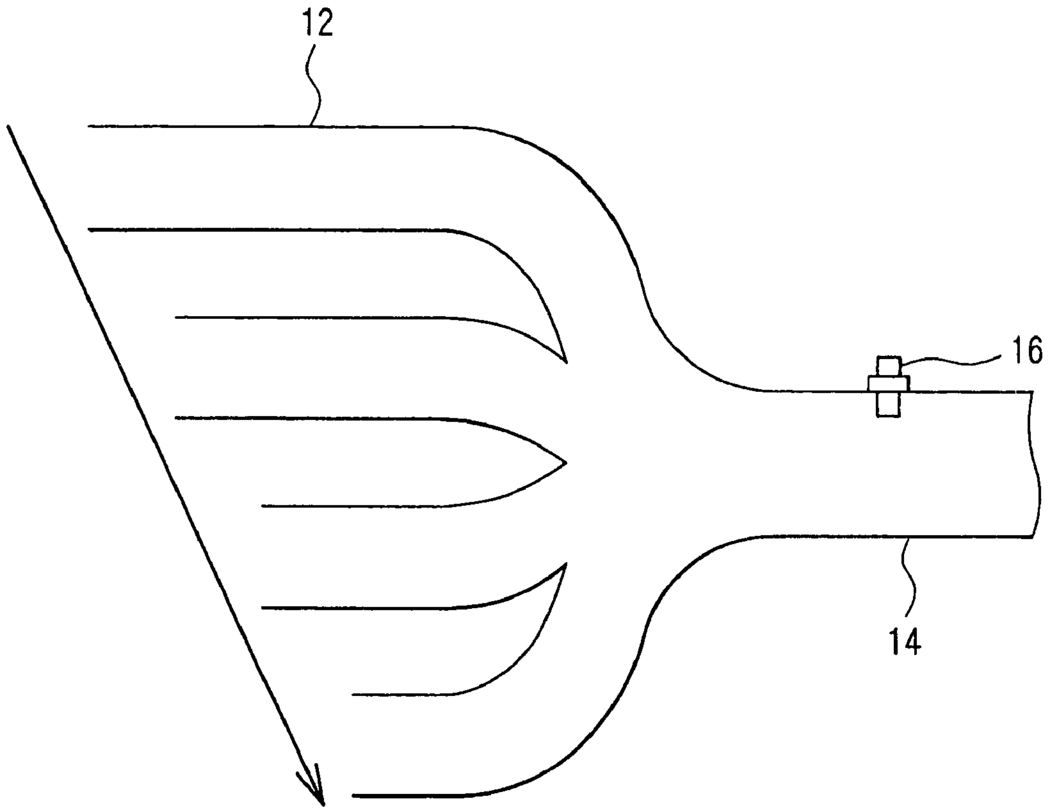
FIG. 6 PRIOR ART
FIG. 6 is a view showing a prior-art example which has an exhaust system of unequal lengths.

In case of an exhaust system in which the lengths of the exhaust manifolds 12 of individual cylinders (hereinbelow, termed "exhaust pipe lengths") are unequal lengths as shown in FIG. 6, the distances of movements by which the exhaust gases of the individual cylinders arrive at the air-fuel ratio sensor 16 are different, and hence, the exhaust gases of the individual cylinders might fail to arrive at the air-fuel ratio sensor 16 in the order of combustions.

In this embodiment, therefore, a plurality of individual-cylinder air-fuel ratio estimation models are created in such a way that the relations between the air-fuel ratios of the individual cylinders and the detection values of the air-fuel ratio sensor 16 are modeled for the respective cylinders by employing model parameters (weighting factors) separate for the respective cylinders. In the V-type 8-cylinder engine 11, accordingly, four sorts of individual-cylinder air-fuel ratio estimation models are created per bank (for the 4cylinders), and the air-fuel ratios of the individual cylinders are estimated using the individual-cylinder air-fuel ratio estimation models which are different for the respective cylinders.

The individual-cylinder air-fuel ratio estimation models of the individual cylinders are models which represent the relations between the air-fuel ratios of the individual cylinders and the detection values of the air-fuel ratio sensor 16, and they are built separately for the respective cylinders by employing the model parameters separate for the respective cylinders. By way of example, the individual-cylinder air-fuel ratio estimation models of the four cylinders #1, #3, #5 and #7 of the A-bank are respectively given by the following formulae:

Individual-cylinder air-fuel ratio estimation model of Cylinder #1:

$$y_s(i) = \sum_{j=1}^{8} a_{1j} \cdot y_s(i-j) + \sum_{j=1}^{8} b_{1j} \cdot u_1(i-j) \tag{11}$$

$$u_1 = [\underbrace{u_1 \ \ u_1}_{\substack{\text{Inputs of} \\ \text{Cylinder \#1} \\ \text{(For exhaust stroke)}}} \ \ \underbrace{e_1 \ \ldots \ e_1}_{\substack{\text{Disturbance} \\ \text{elements} \\ \text{(Numbering 6)}}}]^T$$

Individual-cylinder air-fuel ratio estimation model of Cylinder #3:

$$y_s(i) = \sum_{j=1}^{8} a_{3j} \cdot y_s(i-j) + \sum_{j=1}^{8} b_{3j} \cdot u_3(i-j) \tag{12}$$

$$u_3 = [\underbrace{u_3 \ \ u_3}_{\substack{\text{Inputs of} \\ \text{Cylinder \#3} \\ \text{(For exhaust stroke)}}} \ \ \underbrace{e_3 \ \ldots \ e_3}_{\substack{\text{Disturbance} \\ \text{elements} \\ \text{(Numbering 6)}}}]^T$$

Individual-cylinder air-fuel ratio estimation model of Cylinder #5:

$$y_s(i) = \sum_{j=1}^{8} a_{5j} \cdot y_s(i-j) + \sum_{j=1}^{8} b_{5j} \cdot u_5(i-j) \tag{13}$$

$$u_5 = [\underbrace{u_5 \ \ u_5}_{\substack{\text{Inputs of} \\ \text{Cylinder \#5} \\ \text{(For exhaust stroke)}}} \ \ \underbrace{e_5 \ \ldots \ e_5}_{\substack{\text{Disturbance} \\ \text{elements} \\ \text{(Numbering 6)}}}]^T$$

Individual-cylinder air-fuel ratio estimation model of Cylinder #7:

$$y_s(i) = \sum_{j=1}^{8} a_{7j} \cdot y_s(i-j) + \sum_{j=1}^{8} b_{7j} \cdot u_7(i-j) \tag{14}$$

$$u_7 = [\underbrace{u_7 \ \ u_7}_{\substack{\text{Inputs of} \\ \text{Cylinder \#7} \\ \text{(For exhaust stroke)}}} \ \ \underbrace{e_7 \ \ldots \ e_7}_{\substack{\text{Disturbance} \\ \text{elements} \\ \text{(Numbering 6)}}}]^T$$

Here, $y_s$ denotes the detection value of the air-fuel ratio sensor 16, and u denotes the input air-fuel ratio of each cylinder ($u_1$ denotes the input air-fuel ratio of the cylinder #1, $u_3$ denotes that of the cylinder #3, $u_5$ denotes that of the cylinder #5, and $u_7$ denotes that of the cylinder #7). "$a_{1j}$-$a_{7j}$" and "$b_{1j}$-$b_{7j}$" denote model parameters (weighting factors), and "$e_1$-$e_7$" denote disturbance elements. "i" denotes a current calculation timing, and "j" denotes how many times a calculation timing precedes the current calculation timing "i". In this embodiment, the calculation interval is set at the interval (90° CA) being ½ of the combustion interval (180° CA), and hence, "j" changes from 1 to 8 per cycle (720° CA).

Maximum value of $j$=720° CA/90° CA=8

In this manner, the individual-cylinder air-fuel ratio estimation model of each cylinder is built so as to receive as its input the combination between the air-fuel ratio of the predetermined cylinder whose air-fuel ratio is to be estimated, and the disturbance elements. The disturbance elements are represented by the mean values of the air-fuel ratios of the cylinders other than the predetermined cylinder.

Concretely, the disturbance element $e_1$ of the individual-cylinder air-fuel ratio estimation model of the cylinder #1 is represented by the mean value of the air-fuel ratios of the three cylinders #3, #5 and #7 except the cylinder #1.

$$e_1=(u_3+u_5+u_7)/3$$

The disturbance element $e_3$ of the individual-cylinder air-fuel ratio estimation model of the cylinder #3 is represented by the mean value of the air-fuel ratios of the three cylinders #1, #5 and #7 except the cylinder #3.

$$e_5=(u_1+u_5+u_7)/3$$

The disturbance element $e_5$ of the individual-cylinder air-fuel ratio estimation model of the cylinder #5 is represented by the mean value of the air-fuel ratios of the three cylinders #1, #3 and #7 except the cylinder #5.

$$e_5=(u_1+u_3+u_7)/3$$

The disturbance element $e_7$ of the individual-cylinder air-fuel ratio estimation model of the cylinder #7 is represented by the mean value of the air-fuel ratios of the three cylinders #1, #3 and #5 except the cylinder #7.

$$e_7=(u_1+u_3+u_5)/3$$

Alternatively, the disturbance elements $e_1$-$e_7$ may well be represented by the mean value of the air-fuel ratios of all the cylinders #1, #3, #5 and #7 of the bank-A.

$$e_1=e_3=e_5=e_7=(u_1+u_3+u_5+u_7)/4$$

In this way, all the disturbance elements $e_1$-$e_7$ of the individual-cylinder air-fuel ratio estimation models of the respective cylinders become identical, and hence, advantageously calculation processing is facilitated.

Incidentally, regarding the other bank-B, the individual-cylinder air-fuel ratio estimation models of the respective cylinders #2, #4, #6 and #8 may be created by the same method.

When the formulae of the individual-cylinder air-fuel ratio estimation model of each cylinder #n (n=1-8) are transformed into state space models, the following formulae (15) and (16) are derived:

$$X(i+1)=A_n\cdot X(i)+B_n\cdot u(i)+W_n(i) \quad (15)$$

$$Y(i)=C_n\cdot X(i)+D_n\cdot u(i) \quad (16)$$

Here, $A_n$, $B_n$, $C_n$ and $D_n$ denote the parameters (weighting factors) of the individual-cylinder air-fuel ratio estimation model of each cylinder #n, Y denotes the detection value of the air-fuel ratio sensor 16, X denotes the summation of the influences of the individual-cylinder air-fuel ratio being a state variable, and W denotes noise.

Further, when a Kalman filter is designed in conformity with the above formulae (15) and (16), the following formula (17) is obtained:

$$X\hat{}(k+1|k)=A_n\cdot X\hat{}(k|k-1)+K_{en}\{Y(k)-C_n\cdot A_n\cdot X\hat{}(k|k-1)\} \quad (17)$$

Here, X^(X hat) denotes the estimation value of the summation of the influences of the individual-cylinder air-fuel ratio, and $K_n$ denotes a Kalman gain. The significance of X^(k+1 |k) is to find the estimation value of a time period (k+1) on the basis of the estimation value of a time period (k).

In the above way, the individual-cylinder air-fuel ratio estimation models of the respective cylinders are built by the Kalman filter type observers, whereby the summations of the influences of the individual-cylinder air-fuel ratios can be successively estimated with the proceeding of the combustion cycle. By the way, in a case where an input is an air-fuel ratio deviation, an output Y in the above formula (17) is replaced with an air-fuel ratio deviation.

As in the first or second embodiment, the ECU 20 executes the routines for controlling the air-fuel ratios of the individual cylinders as shown in FIGS. 3 through 5, thereby to estimate the individual-cylinder air-fuel ratios of each bank on the basis of the detection values of the air-fuel ratio sensor 16 of each bank by employing the individual-cylinder air-fuel ratio estimation models which are different for the respective cylinders, and to perform the individual-cylinder air-fuel ratio controls for correcting the fuel injection quantities of the individual cylinders so that the air-fuel ratio dispersion among the cylinders may be lessened every bank.

According to the third embodiment thus far described, the plurality of individual-cylinder air-fuel ratio estimation models are created in such a way that the relations between the air-fuel ratio of the individual cylinders and the detection values of the air-fuel ratio sensor 16 are modeled for the respective cylinders by employing the model parameters separate for the respective cylinders, and the air-fuel ratios of the individual cylinders are estimated using the individual-cylinder air-fuel ratio estimation models which are different for the respective cylinders. Therefore, even in the case of the unequal-interval combustions or the unequal-length exhaust system, the air-fuel ratios of the individual cylinders can be precisely estimated using the individual-cylinder air-fuel ratio estimation models in which the influences of the unequal-interval combustions or the unequal-length exhaust system are considered.

Further, in this embodiment, the individual-cylinder air-fuel ratio estimation model of each cylinder is built so as to receive as its input the combination between the air-fuel ratio of the predetermined cylinder whose air-fuel ratio is to be estimated, and the disturbance elements. Therefore, the individual-cylinder air-fuel ratio estimation model can be built with the influences of the unequal-interval combustions or the unequal-length exhaust system contained in the disturbance elements, to bring forth the advantage that the model different every cylinder can be created comparatively easily.

Moreover, in this embodiment, the disturbance element is represented by the mean value of the air-fuel ratios of the cylinders except the predetermined cylinder whose air-fuel ratio is to be estimated, or it is represented by the mean value of the air-fuel ratios of all the cylinders. Accordingly, there is the advantage that the disturbance elements (the influences of the unequal-interval combustions or the unequal-length exhaust system) can be easily calculated.

What is claimed is:

1. An individual-cylinder air-fuel ratio estimation apparatus for an internal combustion engine, comprising:

an air-fuel ratio sensor which is installed in a confluent exhaust pipe with exhaust manifolds of a plurality of cylinders of the internal combustion engine connected thereto, and which detects an air-fuel ratio of gases exhausted from the individual cylinders; and an individual-cylinder air-fuel ratio estimation means for estimating air-fuel ratios of the individual cylinders on the basis of the air-fuel ratio of the gases as detected by the air-fuel, ratio sensor; and a means for creating a plurality of individual-cylinder air-fuel ratio estimation models by modeling relations between air-fuel ratios of the individual cylinders and detection values of the air-fuel ratio sensor, separately for the respective cylinders, the individual-cylinder air-fuel ratio estimation means estimating the air-fuel ratios of the individual cylinders by employing the individual-cylinder air-fuel ratio estimation models which are different for the respective cylinders.

2. An individual-cylinder air-fuel ratio estimation apparatus for an internal combustion engine as defined in claim 1, wherein each of the individual-cylinder air-fuel ratio estimation models is built so as to receive as its input a combination between the air-fuel ratio of the predetermined cylinder whose air-fuel ratio is to be estimated, and disturbance elements.

3. An individual-cylinder air-fuel ratio estimation apparatus for an internal combustion engine as defined in claim 2, wherein the disturbance element is represented by a mean value of the air-fuel ratios of all the cylinders.

4. An individual-cylinder air-fuel ratio estimation apparatus for an internal combustion engine as defined in claim 2, wherein the disturbance element is represented by a mean value of the air-fuel ratios of the cylinders other than the predetermined cylinder whose air-fuel ratio is to be estimated.

5. An individual-cylinder air-fuel ratio estimation apparatus for an internal combustion engine as defined in claim 1, wherein the individual-cylinder air-fuel ratio estimation models are built separately for the respective cylinders by employing model parameters which are separate for the respective cylinders.

6. An individual-cylinder air-fuel ratio estimation apparatus for an internal combustion engine as defined in claim 1, wherein the internal combustion engine includes a plurality of cylinder groups, the exhaust manifolds of the plurality of cylinders whose combustion intervals are the unequal intervals are connected to the confluent exhaust pipes for the respective cylinder groups, and the air-fuel ratio sensors are installed in the respective confluent exhaust pipes, and the individual-cylinder air-fuel ratio estimation means estimates the air-fuel ratios of the individual cylinders by employing the individual-cylinder air-fuel ratio estimation models which are different for the respective cylinders of each of the cylinder groups.

7. An individual-cylinder air-fuel ratio control apparatus for an internal combustion engine, comprising:

an air-fuel ratio sensor which is installed in a confluent exhaust pipe with exhaust manifolds of a plurality of cylinders of the internal combustion engine connected thereto, and which detects an air-fuel ratio of gases exhausted from the individual cylinders, an individual-cylinder air-fuel ratio estimation means for estimating air-fuel ratios of the individual cylinders on the basis of the air-fuel ratio of the gases as detected by the air-fuel ratio sensor, the individual-cylinder air-fuel ratio estimation means estimating the air-fuel ratios of the individual cylinders by employing the individual-cylinder air-fuel ratio estimation models which are different for the respective cylinders;

a means for creating a plurality of individual-cylinder air-fuel ratio estimation models by modeling relations between air-fuel ratios of the individual cylinders and detection values of the air-fuel ratio sensor, separately for the respective cylinders; and an individual-cylinder air-fuel ratio control means for controlling the air-fuel ratios of the individual-cylinders in a direction of decreasing an inter-cylinder dispersion of the individual-cylinder air-fuel ratios estimated by the individual-cylinder air-fuel ratio estimation apparatus.

* * * * *